United States Patent
Notohara et al.

[19]

[11] Patent Number: 6,075,328
[45] Date of Patent: Jun. 13, 2000

[54] PWM/PAM CONTROL MODE SWITCHING TYPE MOTOR CONTROL APPARATUS, AND MOTOR DRIVE AND AIR-CONDITIONER USING THE SAME

[75] Inventors: Yasuo Notohara, Hitachiota; Yukio Kawabata, Hitachinaka; Makoto Ishii, Utsunomiya; Hiroshi Shinozaki; Kouji Katou, both of Ohira-machi; Yuhachi Takakura, Oyama, all of Japan

[73] Assignee: Hitachi, Ltd., Tokyo, Japan

[21] Appl. No.: 08/946,937

[22] Filed: Oct. 8, 1997

[30] Foreign Application Priority Data

Oct. 18, 1996 [JP] Japan ................................. 8-275845
Oct. 18, 1996 [JP] Japan ................................. 8-275846

[51] Int. Cl.$^7$ ................................................. H02K 23/00
[52] U.S. Cl. ......................... 318/254; 318/439; 318/801; 318/811; 388/811
[58] Field of Search ................... 318/798–811, 254, 318/439; 388/811, 815, 819

[56] References Cited

U.S. PATENT DOCUMENTS

| | | | |
|---|---|---|---|
| 4,636,928 | 1/1987 | Deguchi et al. | 363/41 |
| 4,698,744 | 10/1987 | Itani et al. | 364/140 |
| 4,855,652 | 8/1989 | Yamashita et al. | 318/811 |
| 4,935,684 | 6/1990 | Watanabe | 318/729 |
| 5,119,071 | 6/1992 | Takezawa et al. | 318/130 |
| 5,731,681 | 3/1998 | Inaniwa et al. | 318/729 |
| 5,739,650 | 4/1998 | Kimura et al. | 318/254 |
| 5,929,591 | 7/1999 | Katou et al. | 318/808 |

FOREIGN PATENT DOCUMENTS

| | | |
|---|---|---|
| 0 283 954 A2 | 9/1988 | European Pat. Off. . |
| 0 695 035 A2 | 1/1996 | European Pat. Off. . |
| 0 697 569 A1 | 2/1996 | European Pat. Off. . |
| 0 856 936 A1 | 8/1998 | European Pat. Off. . |
| 7-250493 | 9/1995 | Japan . |

*Primary Examiner*—David Martin
*Attorney, Agent, or Firm*—Antonelli, Terry, Stout & Kraus, LLP

[57] ABSTRACT

A motor drive apparatus and an air-conditioner using the motor control apparatus has a feature which allows it to gradually increase a dc voltage value to a predetermined value when starting the switching operation of a chopper circuit by dc voltage control thereof, and when stopping the switching operation of the chopper circuit to be able to gradually decrease the dc voltage value to a predetermined value. Further, the dc voltage command value is adjusted so as to make it possible to maintain a preferred value of dc voltage. Thereby, fluctuation in the number of revolutions of the motor can be prevented even if the converter is started or stopped while the motor is operating, thereby allowing the motor drive apparatus and air-conditioner using the motor control apparatus of the invention to be operated at their maximum capacities.

32 Claims, 9 Drawing Sheets

PWM/PAM CONTROL MODE SWITCHING TYPE MOTOR CONTROL APPARATUS, AND MOTOR DRIVE AND AIR-CONDITIONER USING THE SAME

BACKGROUND OF THE INVENTION

A conventional motor drive apparatus which combines a power circuit including a rectifying circuit for rectifying a.c. to d.c. and a means for suppressing harmonics in a power supply current with a motor drive circuit is described in JP-A Nos.6-105563 and 7-115788.

The conventional motor drive apparatus is provided with a converter circuit of power factor improvement type using a booster chopper circuit which executes suppression of harmonics in the power source current and d.c. voltage control simultaneously, and an inverter circuit which drives the motor, and the same executes its motor speed control by controlling its d.c. voltage and inverter conduction ratio.

SUMMARY OF THE INVENTION

According to the prior art described above, when a load coupled to the motor is relatively light, the motor speed control is executed by controlling such that its d.c. voltage becomes minimum in a range which allows suppression of harmonics in the power source current, and at the same time by controlling the conduction ratio by means of the inverter. When a load coupled to the motor is relatively heavy, the motor speed control is executed, while holding the conduction ratio of the inverter at 100%, by incrementing or decrementing the d.c. voltage by means of the converter. In other words, at the time of a light load, PWM control by means of the inverter is executed, and at the time of a heavy load, PAM control by means of the converter is executed.

When the converter circuit used is of a type of the power factor improvement converter circuit, since it uses a booster chopper circuit, its d.c. voltage increases rapidly when a power consumption in the load coupled to the converter circuit drops. Therefore, when the power consumption in the load coupled to the prior art power factor improvement type converter circuit is not large enough, the operation of the converter is caused to stop. Namely, the converter is adapted to start its operation when the load becomes greater than a predetermined value.

Therefore, according to the prior art motor speed control, the converter is caused to start or stop while the motor is in operation thereby causing its d.c. voltage to vary, thus varying the motor speed.

In the prior art converter control circuit, in order to prevent occurrence of a surge in the d.c. voltage at the time of start-up and protect the converter, a process to gradually increase the conduction ratio of the booster chopper is used.

However, no consideration has been made in the prior art as to a problem of variance in the number of revolutions of the motor resulting from a d.c. voltage fluctuation at the time of start or stop of the motor.

In addition, the prior art motor control apparatus is associated with the following problems.

While in the PAM control mode under a heavy load, when the load of the motor is increased further, a d.c. voltage value is increased significantly in the converter to a value in the vicinity of its maximum limit value specified by a circuit configuration of the converter.

In the prior art motor drive apparatus, a range of operation is set for the motor drive apparatus such that the value of its d.c. voltage will not exceed its maximum limit value, or a limiter is set for command values of the d.c. voltage such that no command is issued exceeding its maximum limit value. Further, a protection circuit is provided for stopping operation of the motor drive apparatus in case the value of the d.c. voltage happens to exceed the maximum limit value thereof due to occurrence of abnormality or malfunctioning.

In order to operate the motor drive apparatus at the maximum capacity thereof, it is necessary to maintain its d.c. voltage at a value in the vicinity of the maximum limit value thereof. In particular, for a motor drive apparatus which can operate in a wide range from a light load to a heavy load by means of the inverter control, it is necessary to provide for a high precision d.c. voltage control system which is independent of load conditions. Such high precision motor drive apparatus needs to have a complicated control system, and thus is costly.

An object of the present invention is to provide for a motor control apparatus which can prevent variance in the number of revolutions of the motor at the time of start-up or stop of the converter during operation of the motor, and a motor drive apparatus and air-conditioner using the same.

Another object of the invention is to provide for a motor control apparatus which has a d.c. voltage control system which is simple and not costly, and can operate at the maximum capacity thereof, and a motor drive apparatus and air-conditioner using the same.

The present invention relates to a power circuit for controlling a d.c. voltage, a motor control apparatus for controlling the number of revolutions of the motor to a preferred speed, and an air-conditioner which uses the same motor control apparatus for driving a compressor motor thereof.

Features of the invention for accomplishing the above-mentioned objects of the invention will be described in the following. A motor control apparatus according to the invention is comprised of: a converter circuit having a rectifying circuit, a smoothing circuit, and a chopper circuit which increments or decrements its d.c. voltage by means of switching operation of switching elements and an energy storage effect by inductance; an inverter circuit which is connected to an output side of the converter circuit; a d.c. voltage detection circuit which detects a d.c. voltage value at the output side of the converter circuit; a d.c. voltage control means which controls switching operation of the chopper circuit on the basis of an output value from the d.c. voltage detection circuit and a d.c. voltage command value such that the d.c. voltage value having been detected becomes equal to the d.c. voltage command value; an inverter control circuit which controls the switching operation of the inverter circuit which drives the motor; a speed control means which produces a d.c. voltage command and a conduction ratio signal to the d.c. voltage control means and the inverter control circuit to execute the speed control of the motor; and the motor. This motor control apparatus, when starting the switching operation of the chopper circuit, by means of the d.c. voltage control means is characterized by executing the steps of: enabling the switching operation of the chopper circuit; controlling a d.c. voltage value to be increased gradually to a predetermined value. When stopping the switching operation of the chopper circuit, the same is characterized by executing the steps of: controlling a d.c. voltage value to be decreased gradually to a predetermined value; then stopping the switching operation of the chopper circuit.

According to these features of the invention described above, fluctuation of the d.c. voltage occurring at the time of start-up or stoppage of the converter can be suppressed, and a smooth d.c. voltage control can be realized. Further, when a motor drive circuit is coupled to the converter circuit as a load thereof, fluctuation of the motor speed can be suppressed thereby realizing a stable speed control thereof.

Further, an improved d.c. voltage control corresponding to changes in the power supply voltage can be provided by the steps of: detecting a d.c. voltage of the converter during its stoppage; defining a value of this detected d.c. voltage as a d.c. voltage minimum value; and defining an initial value of a d.c. voltage command value to be applied at the time of start-up of the converter by adding an appropriate value to the d.c. voltage minimum value.

Still further, an improved criterion for determining stoppage of the converter can be provided by the steps of: comparing a d.c. voltage and a command value corresponding thereto; judging whether or not the d.c. voltage is responsive to the command value; and stopping the converter when the d.c. voltage is no more compliant with the command value.

The another feature of the motor control apparatus which is comprised of: a converter circuit which has the rectifying circuit for rectifying the a.c. power supply to d.c., the smoothing circuit, and the chopper circuit which increments or decrements the d.c. voltage using the switching operation of switching elements and the energy storage effect by inductance; the inverter circuit coupled to the output side of the converter circuit; the d.c. voltage detection circuit for detecting the d.c. voltage value at the output side of the converter circuit; the d.c. voltage control means for controlling the switching operation of the chopper circuit on the basis of the output value from the d.c. voltage detection circuit and the d.c. voltage command value such that the d.c. voltage value becomes equal to the d.c. voltage command value; the inverter control circuit for controlling the switching operation of the inverter circuit for driving the motor; the speed control means for controlling the motor speed by outputting the d.c. voltage command value and the conduction ratio signal to the d.c. voltage control means and the inverter control circuit; and the motor, resides in that by means of the d.c. voltage control means, the d.c. voltage command value is no more increased upon detection of the d.c. voltage detection value which exceeds a predetermined value.

According to this another feature of the invention described above, without need of provision of a high precision d.c. voltage control system, it becomes possible to control the d.c. voltage at the maximum value thereof, thereby enabling the motor coupled to the motor control apparatus of the invention to be operated at the maximum output capacity. Further, independent of the load conditions, a constant d.c. voltage maximum value can be obtained.

Still further, the d.c. voltage value can be controlled at a predetermined value by decrementing the d.c. voltage command value sequentially when the d.c. voltage detection value exceeds a predetermined value.

Furthermore, a problem of an overshoot of the d.c. voltage value can be prevented by decreasing a value of increase to be applied to the d.c. voltage command value when the d.c. voltage detection value approaches to the vicinity of a predetermined value.

BRIEF DESCRIPTION OF THE DRAWINGS

Other features and advantages of the invention will be apparent from the following description taken in connection with the accompanying drawings wherein.

DETAILED DESCRIPTION OF THE PREFERRED EMBODIMENTS

EMBODIMENT 1

A motor drive apparatus according to a first embodiment of the invention will be described in detail in the following.

Figure 1:
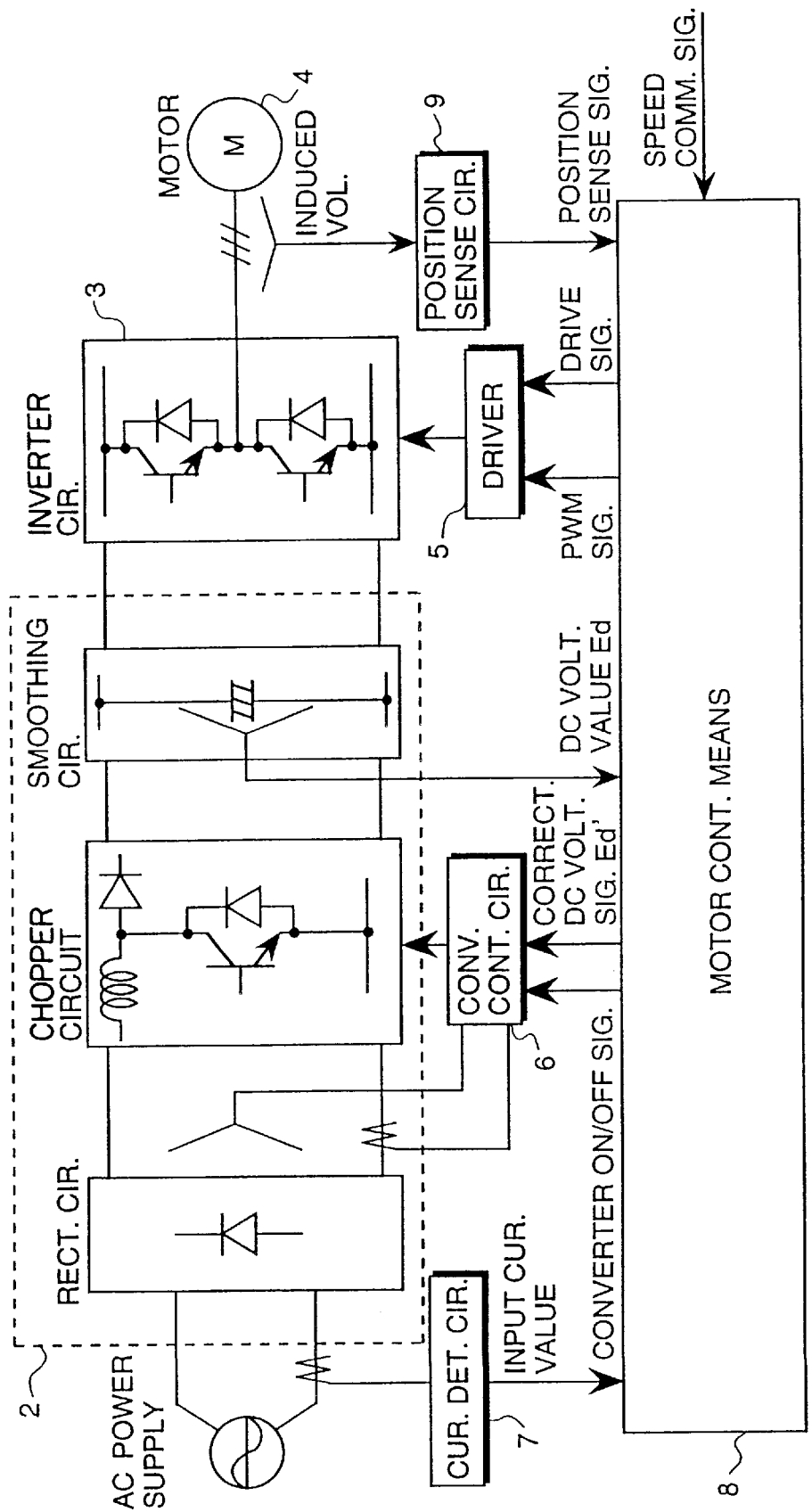
FIG. 1 is a schematic block diagram of a motor drive apparatus according to a first embodiment of the invention.

A schematic block diagram of the motor drive apparatus of the first embodiment of the invention is shown in FIG. 1. The motor drive apparatus of this embodiment of the invention is comprised of: a converter circuit 2 which controls an amplitude of a d.c. voltage using a rectifying circuit and a booster chopper circuit; an inverter circuit 3 which inverts the d.c. voltage to an a.c. voltage with a predetermined value; a motor control means 8 which executes speed control of a brushless d.c. motor 4 in response to a speed command; a position sense circuit 9 which senses positions of magnetic poles of brushless d.c. motor 4; a converter control circuit 6 which controls the converter circuit 2 on the basis of a correction d.c. voltage signal from the motor control means 8 and a converter ON/OFF signal; a driver 5 which drives inverter circuit 3 on the basis of a PWM signal and a drive signal from motor control means 8; and a current detection circuit 7 which detects a current from a.c. power supply 1 and transmits the current detected to motor control means 8.

Figure 2:
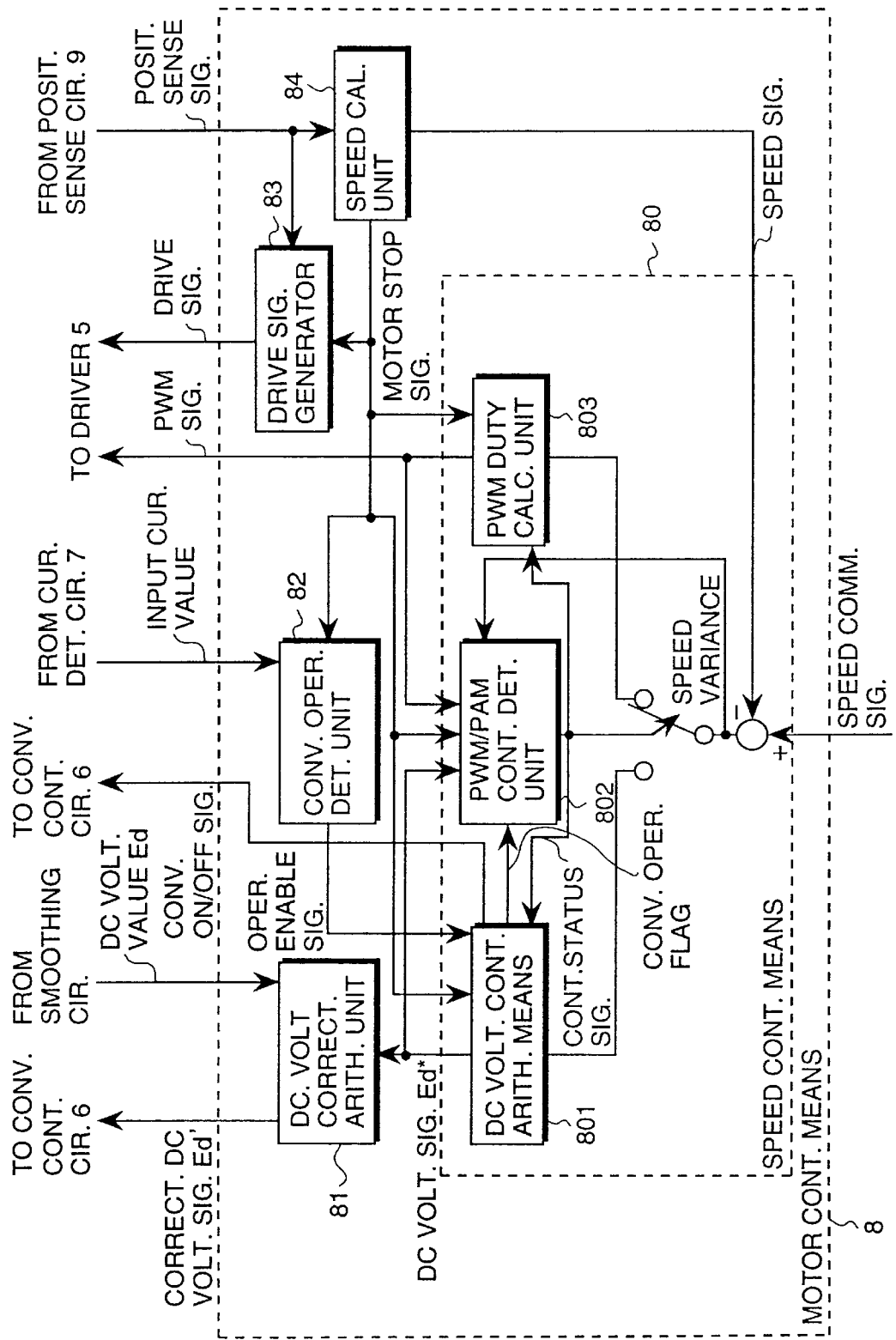
FIG. 2 is a schematic block diagram indicating details of the configuration of a motor control means 8 of FIG. 1.

FIG. 2 shows an internal configuration of motor control means 8 of the invention. Motor control means 8 executes speed control of brushless d.c. motor 4 on the basis of a speed signal which was computed from a position sense signal output from position sense circuit 9 and a speed command signal provided externally. Since the motor control means 8 of the invention uses a microcomputer, all of the arithmetic operations within the motor control means 8 are executed by software processing thereof.

A position sense signal detected by position sense circuit 9 is input to a drive signal generator 83 and a speed calculation unit 84. Drive signal generator 83 produces a drive signal on the basis of the position sense signal. Speed calculation unit 84 computes a speed of the brushless d.c. motor 4 from the position sense signal, and also issues a motor stop signal when the motor is determined at stoppage.

Converter operation determination unit 82 in response to an input current value from current detection circuit 7 outputs an operation enable signal only when the input current value exceeds a preset value.

The d.c. voltage correction arithmetic unit 81 calculates a correction d.c. voltage Ed' on the basis of d.c. voltage value Ed output from converter circuit 2 and d.c. voltage command value Ed* output from d.c. voltage control arithmetic means 801. Here, correction d.c. voltage signal Ed' is calculated such that a certain value (d.c. voltage fixed command value Vr)is output when d.c. voltage value Ed coincides with d.c. voltage command value Ed*. More specifically, Ed' is calculated according to equation 1 as follows.

$$Ed' = (Ed/Ed^*) \times Vr \quad (1)$$

where, Ed': d.c. voltage correction value, Ed: d.c. voltage detection value, Ed*: d.c. voltage command value, and Vr: d.c. voltage fixed command value.

Necessity of calculation of the d.c. voltage correction according to equation 1 in d.c. voltage correction arithmetic unit 81 will be described in the following.

Converter control circuit 6 is provided with a d.c. voltage control circuit, which is not shown. A d.c. voltage command value to this d.c. voltage control circuit is a fixed value (d.c. voltage fixed command value), thereby the d.c. voltage control of the d.c. voltage control circuit is enabled by changing the detection gain of a d.c. voltage detection circuit thereof (not shown). Thereby, the d.c. voltage to be input to converter control circuit 6 needs to be corrected.

If the d.c. voltage control circuit has a configuration to allow input of an arbitrary d.c. voltage command value, there is no need to execute the d.c. voltage correction calculation according to equation 1. Further, if the converter control circuit 6 is not provided with the d.c. voltage control circuit described above, a d.c. voltage control unit instead of the d.c. voltage correction arithmetic unit 81 may be provided.

Speed control means 80 obtains a speed variance between the speed command signal and the speed signal, and calculates, on the basis of the speed variance obtained above, a PWM signal to inverter circuit 3 and a d.c. voltage command value Ed* to d.c. voltage correction arithmetic unit 81.

PWM/PAM control determination unit 802 determines whether the speed control of brushless d.c. motor 4 should be executed by the PWM control using the inverter or by the PAM control using the converter on the basis of a motor stop signal from speed calculation unit 84, a PWM signal from PWM duty calculation unit 803, and d.c. voltage command value Ed* from d.c. voltage control arithmetic means 801.

The d.c. voltage control arithmetic means 801 calculates d.c. voltage command value Ed* on the basis of the speed variance, a control status signal from PWM/PAM control determination unit 802, a motor stop signal from speed calculation unit 84 and an operation enabling signal from converter operation determination unit 82, and also outputs a converter operation flag and converter ON/OFF signal. The d.c. voltage command value Ed* and converter ON/OFF signal are output to converter control circuit 6, and the converter operate flag is output to PWM/PAM control determination unit 802.

Here, d.c. voltage command value Ed* assumes a minimum value when the control status signal indicates the PWM control mode, and has a d.c. voltage command value corresponding to a speed variance when the control status signal indicates the PAM control mode. In other words, the d.c. voltage is incremented or decremented corresponding to the speed variance.

The converter ON/OFF signal becomes a converter ON when the motor stop signal indicates that the motor is in operation and the operate enable signal indicates that the converter operation is allowed. By the converter ON signal of the converter ON/OFF signal, converter circuit 2 starts its operation so as to coincide d.c. voltage value Ed with d.c. voltage command value Ed*.

PWM duty calculation unit 803 calculates and outputs a PWM signal on the basis of the speed variance and the control status signal from PWM/PAM control determination unit 802. Here, the PWM signal takes a value representing a conduction ratio corresponding to a speed variance when the control status signal indicates the PWM control mode. And, when the control status signal indicates the PAM control mode, the PWM signal designates 100% of conduction ratio. By way of example, when the motor stop signal indicates a motor stoppage status, the PWM signal designates 0% of conduction ratio. Namely, conduction of brushless d.c. motor 4 is prohibited.

Figure 3:
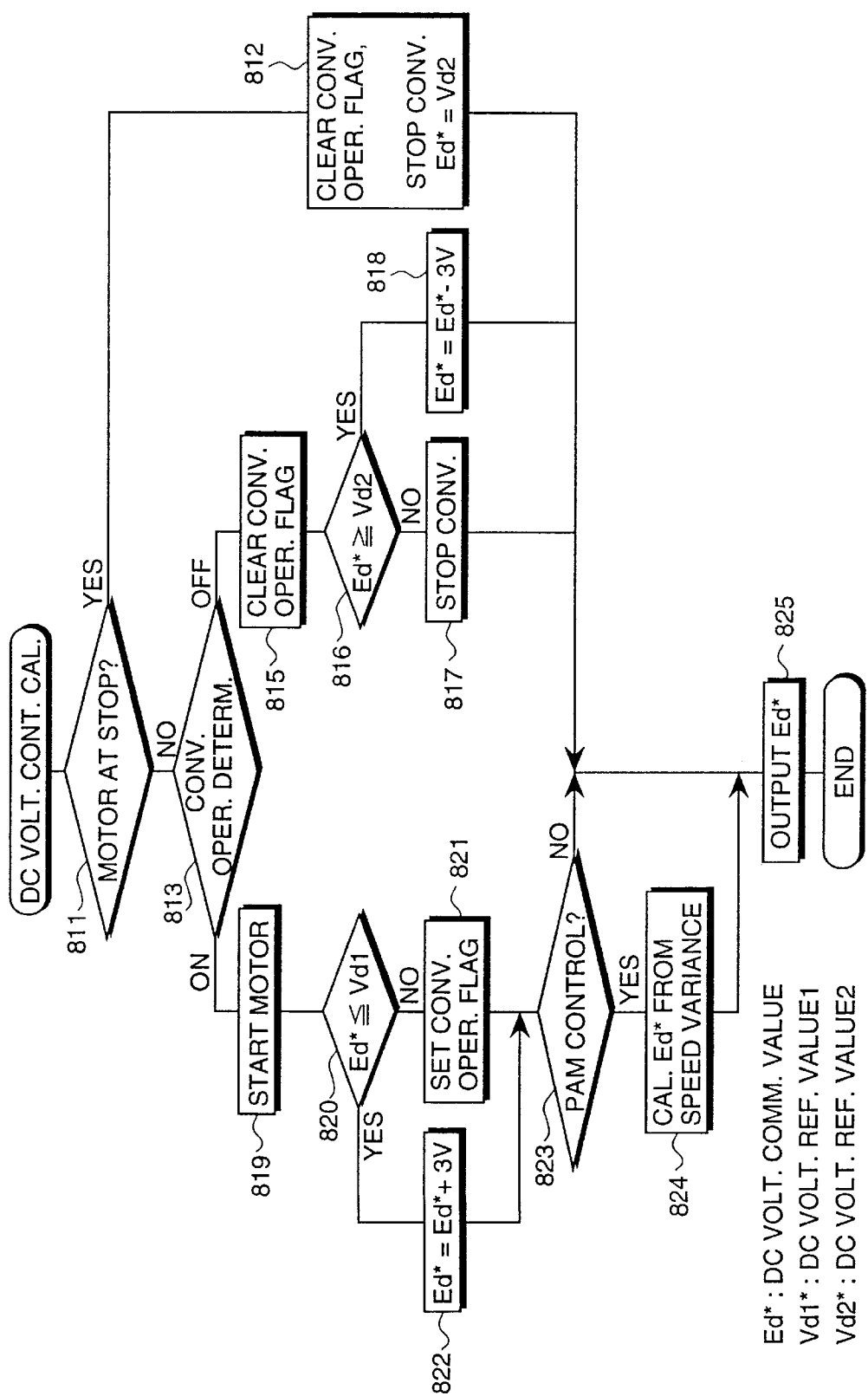
FIG. 3 is a diagram of flowchart indicating operations of a d.c. voltage control arithmetic means 801 of FIG. 2.

With reference to FIG. 3, operations in the d.c. voltage control arithmetic means 801 will be described. FIG. 3 shows process steps of the d.c. voltage control arithmetic means 801 in a flow chart.

In step (811), whether the brushless d.c. motor 4 is in operation or stoppage is determined according to the motor stop signal from speed calculation unit 84.

When the motor is at stoppage, in step (812), the converter operation flag is cleared to be ready for the converter to stop, and the converter ON/OFF signal is set at converter OFF. At this instant, d.c. voltage command value Ed* coincides with d.c. voltage reference value Vd2 (a full-wave rectification voltage value of the power supply voltage).

When the motor is in operation, in step (813), it is determined whether or not to operate the converter on the basis of the operation enabling signal from converter operation determination unit 82. When the converter operation enabling signal designates operation enable, the step moves to (819), and when the same designates converter stoppage, the step moves to (815), respectively.

When the step moves to (815), processes to decrement d.c. voltage Ed gradually then to stop the converter are executed (815–818).

In step (815), the converter operation flag is cleared. In step (816), d.c. voltage command value Ed* and d.c. voltage reference value Vd2 are compared. When d.c. voltage command value Ed* becomes smaller than d.c. voltage reference value Vd2, the step goes to (817) where a converter OFF signal is produced to stop the converter.

To the contrary, when d.c. voltage command value Ed* is greater than d.c. voltage reference value Vd2, the step advances to (818) where 3 V is subtracted from d.c. voltage command value Ed*. The reason why d.c. voltage command value Ed* is compared with d.c. voltage reference value Vd2 in (816) is because that there is a possibility that an actual d.c. voltage value Ed does not coincide with d.c. voltage command value Ed*.

Alternatively, when the step moves from (813) to (819), processes to start the converter and increase the d.c. voltage gradually are executed (819–822). In addition, when the PAM control is to be executed, PAM control processes are executed in steps (823–825).

In step (819), for readying to operate the converter, a converter ON signal as the converter ON/OFF signal is output to converter control circuit 6. In step (820), d.c. voltage command value Ed* and d.c. voltage reference value Vd1 (a full-wave rectification voltage of a.c. power supply 1 plus 10 V) are compared, then in step (822), d.c. voltage command value Ed* is incremented by adding 3 V until d.c. voltage command value Ed* equals d.c. voltage reference value Vd1.

When d.c. voltage command value Ed* becomes greater than d.c. voltage reference value Vd1, the step moves to (821) where for readying to operate the converter, a converter operation flag is set, and which is output to PWM/PAM control determination unit 802.

In step (823), the control mode is determined whether it is in the PWM control or the PAM control on the basis of the control status signal from PWM/PAM control determination unit 802. When it is determined to be in the PAM control, the step moves to (824) where d.c. voltage command value Ed* is computed from the speed variance, and this d.c. voltage command value Ed* computed is output to d.c. voltage correction arithmetic unit 81 in step (825).

This sequence of processing described above is repeated cyclicly at a control cycle which is sufficient to ensure adequate speed control of the motor.

Figure 4:
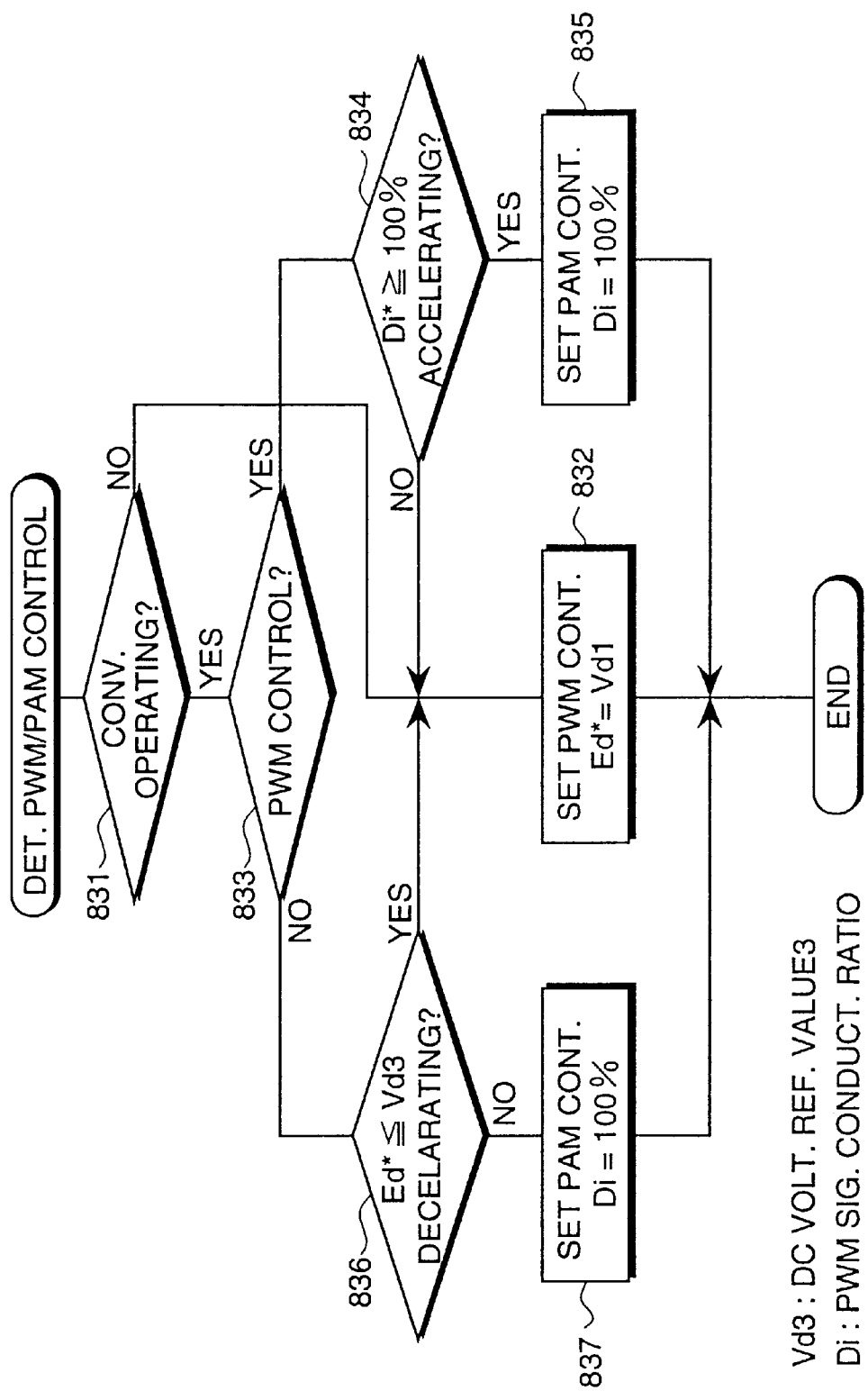
FIG. 4 is a diagram of flowchart indicating operations of a PWM/PAM control determination unit 802 of FIG. 2.

Now, operations in PWM/PAM control determination unit 802 will be described in detail with reference to FIG. 4, which depicts processing of PWM/PAM control determination in a flowchart.

In step (831), a converter operation flag from d.c. voltage control arithmetic unit 801 is detected to determine whether the converter is operating or at stoppage. When the converter is determined to be at stoppage, since the PAM control is not allowed, the step jumps to (832) where the PWM control is forcibly set, and the d.c. voltage command value is fixed at d.c. voltage reference value Vd1(the full-wave rectification voltage of a.c. power supply 1 plus 10 V) from d.c. voltage control arithmetic means 801.

When the converter is determined to be in operation, the step moves to (833) where a present control status is confirmed. When the control status is in the PWM control mode, the step moves to (834) where it is determined whether the PWM signal conduction ratio to the inverter is 100% or not, and also whether the motor requires further acceleration (positive sign for the speed variance) or not. Only when the conduction ratio is 100% and further acceleration is required, the step moves to (835) where the control status signal is set in the PAM control mode, and is output to d.c. voltage control arithmetic means 801 and PWM duty calculation unit 803. Then, PWM duty calculation unit 803 fixes the conduction ratio of the PWM signal at 100% to be output to driver 5.

When the conduction ratio is less than 100%, or no further acceleration is required, the step goes to (832). When the PAM control status is verified in (833), the step moves to (836) where it is determined whether d.c. voltage command value Ed* is smaller than a d.c. voltage reference value Vd3 (d.c. voltage reference value Vd1 minus 5 V) or not, and also whether the motor requires further deceleration (negative sign of the speed variance) or not. Only when d.c. voltage command value Ed* is smaller than d.c. voltage reference value Vd3, and further deceleration is required, the step moves to (832) where the PWM control is set and d.c. voltage command value Ed* is changed.

When d.c. voltage command value Ed* is greater than d.c. voltage reference value Vd3, or the further deceleration is not required, the step moves to (837) where the PAM control is maintained. The processing in (837) is the same as in (835).

D.C voltage reference values Vd1–Vd3 used in the processing hereinabove are determined from d.c. voltage values Ed obtained during the motor in operation and the converter at stoppage. However, when the voltage of a.c. power supply 1 is fixed, predetermined fixed values may be used instead of these reference values.

Figure 5:
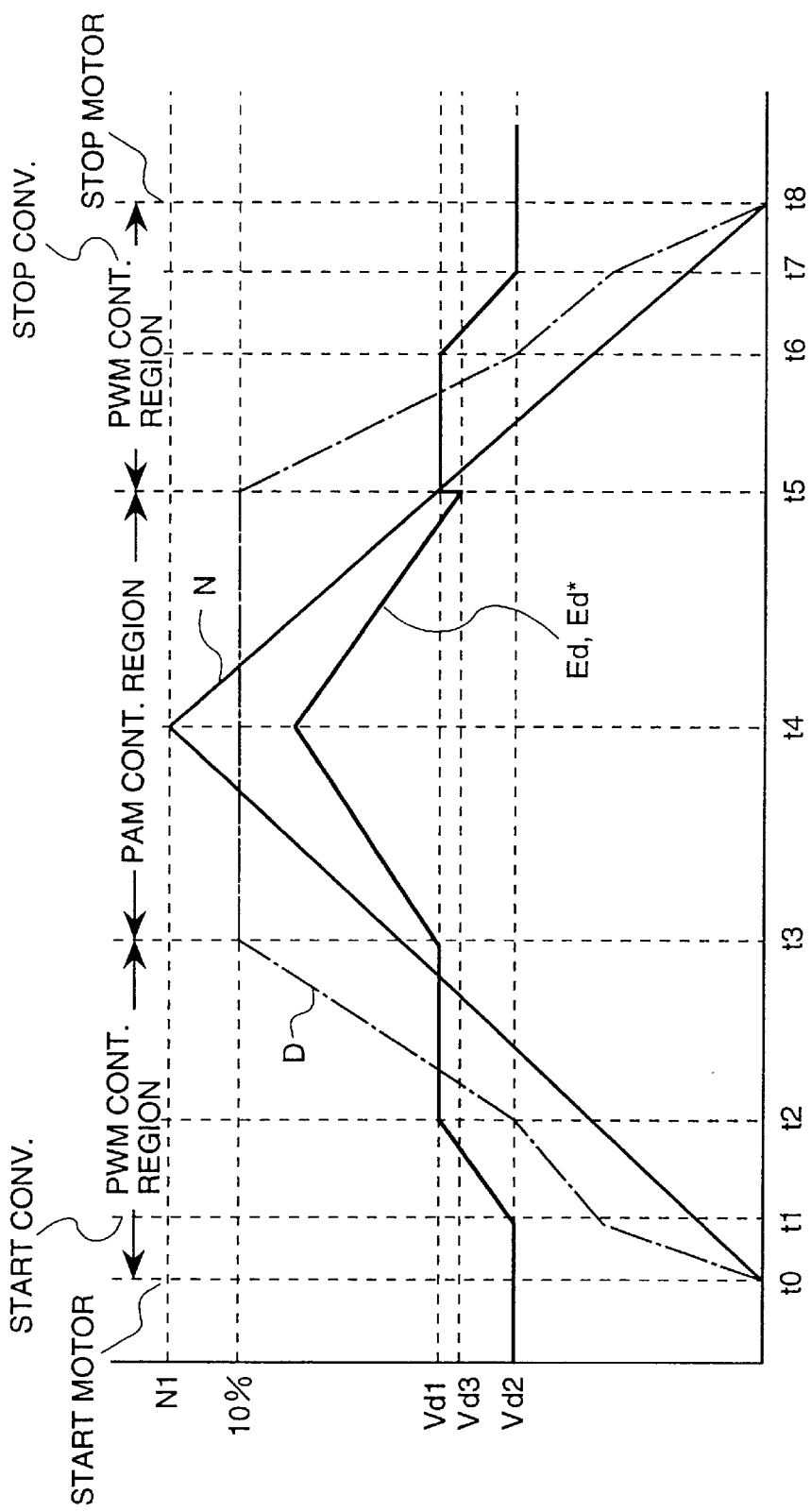
FIG. 5 is a diagram indicating respective changes of d.c. voltage Ed, d.c. voltage command value Ed*, PWM signal conduction ratio D and the number of revolutions N of the motor with time, which were obtained when brushless motor 4 of FIG. 1 was controlled by the motor drive apparatus of the first embodiment of the invention.

With reference to FIG. 5, changes of d.c. voltage Ed, d.c. voltage command value Ed*, PWM signal conduction ratio D, and the number of revolutions N of the motor are indicated which were obtained when the speed control of brushless d.c. motor 4 was executed by means of the motor drive apparatus of the invention. Voltage values, conduction ratios and the number of revolutions are indicated on the ordinate, and time is indicated on the abscissa. Vd1 corresponds to d.c. voltage reference value Vd1, Vd2 corresponds to d.c. voltage reference value Vd2, and Vd3 corresponds to d.c. voltage reference value Vd3, respectively.

When the motor is started at time t0, conduction ratio D and the number of revolutions N are caused to increase. When the motor starts driving, and an input current (not shown) is increased to exceed a preset value at time t1, the converter is started so as to gradually increase d.c. voltage Ed from Vd2 to Vd1. At this time, a rate of increase of conduction ratio D becomes smaller since d.c. voltage Ed increases.

When dc voltage command value Ed* reaches Vd1 at time t2, dc voltage Ed stops its increase. When a further increase of the number of revolutions N of the motor is required, conduction ratio D is increased up to 100% so as to increase the number of revolutions of the motor.

When a still further acceleration is required after conduction ratio D reached 100% at time t3, the control status is changed from the PWM control to the PAM control, then dc voltage Ed (dc voltage command value Ed*) is increased so as to increase the number of revolutions N of the motor while maintaining the conduction ratio D fixed at 100%.

Now, at time t4, when the number of revolutions N of the motor is to be decreased, dc voltage Ed (dc voltage command value Ed*) is caused to decrease at first contrary to the steps of acceleration. At time t5 at which dc voltage command value Ed* coincides with Vd3, when a further deceleration of the motor speed N is required, the control status is changed from the PAM control to the PWM control, and conduction ratio D is caused to decrease so as to decelerate the motor while maintaining dc voltage Ed (dc voltage command value Ed*) fixed at Vd1.

At time t6 at which the number of revolutions N of the motor is decreased substantially, the load becomes lighter, and the input current becomes less than the preset value, then the dc voltage Ed(dc voltage command value) is caused to decrease gradually from Vd1 to Vd2. When the dc voltage value reaches Vd2 at t7, the converter is stopped its operation. To further decrease the number of revolutions N, conduction ratio D is caused to decrease further. At time t8, the motor stops its operation.

According to the features of the motor drive apparatus of the invention, the speed control of brushless dc motor 4 is executed by means of the PWM control using the inverter when the load coupled to the motor is light, and by means of the PAM control using the converter when the load of the motor becomes higher.

Figure 6:
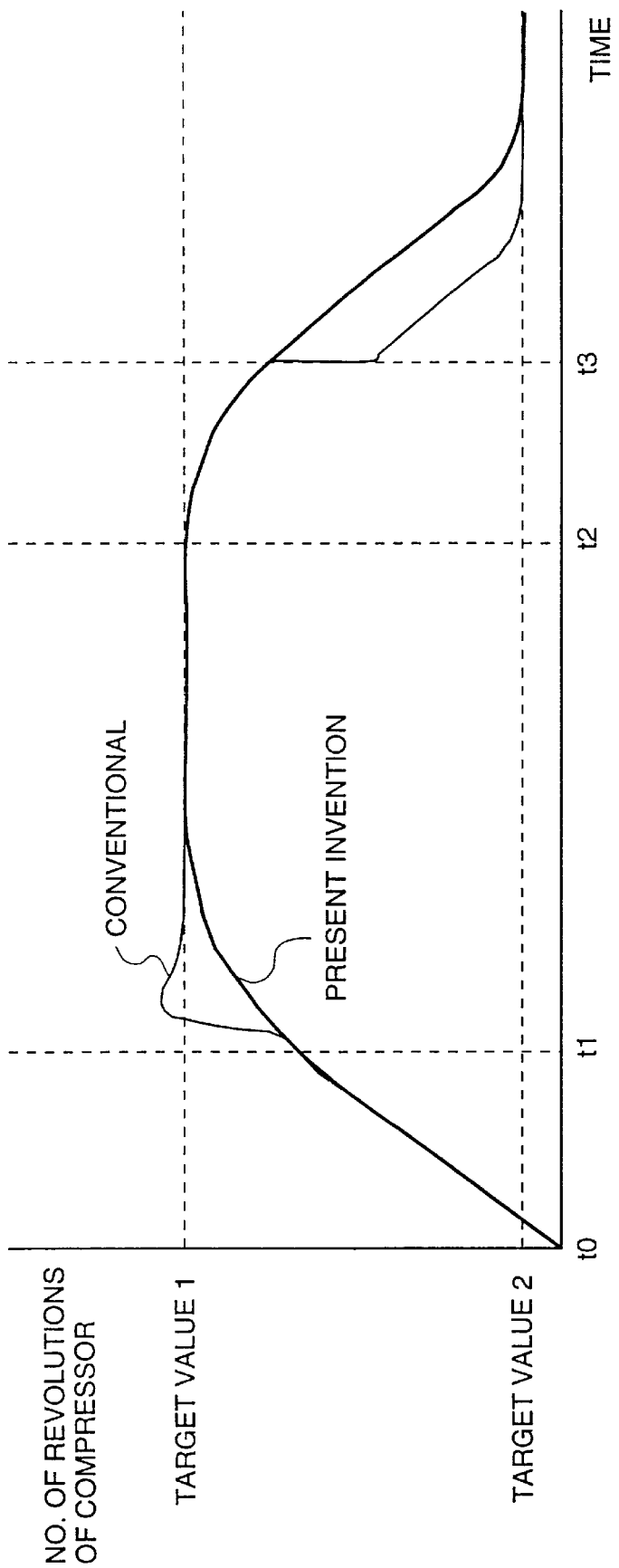
FIG. 6 is a block diagram indicating changes in the number of revolutions of the motor for use in driving an air-conditioner's compressor, which is controlled by the motor drive apparatus of the first embodiment of the invention.

With reference to FIG. 6, a change of the number of revolutions of the motor drive apparatus according to the embodiment of the invention which was applied for controlling a motor for driving an air-conditioner's compressor is depicted in comparison with that of the prior art. A thick solid line represents the present invention and a thin solid line represents the prior art. The number of revolutions of the compressor is depicted on ordinate, and the time is depicted on abscissa.

When the compressor is started at time t0 toward a command revolution target value 1, the converter is caused to start at time t1. At this instant, according to the prior art, since its dc voltage rises abruptly simultaneous with the start-up of the converter, its revolution control system cannot follow such abrupt changes thereby allowing an abrupt increase and an overshoot in the number of revolutions of the compressor to occur. This phenomenon takes place at the start-up of the converter in an initial stage of operation of the air-conditioner during which the pressure of air-conditioner cycle is low, and in particular, its occurrence is remarkable when a motor drive apparatus having a revolution control system having a slow response is used. In contrast to this prior art, according to the motor drive apparatus of the embodiment of the invention, since dc voltage Ed is increased gradually upon start-up of the converter, there occurs no abrupt change in the number of revolutions.

Further, when a command revolution number (not shown) is changed to target value 2 at time t2, the load is reduced at time t3 to satisfy the condition for the converter to stop. At this instant, according to the prior art, since the converter is stopped at t3, its dc voltage Ed drops abruptly, thereby accordingly dropping the number of revolutions of the compressor. At this instant, when a quantity of variance in the number of revolutions becomes great, pole position sensing for the motor becomes difficult, thereby sometimes causing the compressor to halt its operation. To the contrary, according to the invention, since its dc voltage Ed is gradually decreased from Vd1 to Vd2, and the converter is stopped when the dc voltage reaches the full-wave rectification voltage value of the power supply voltage (Vd2), there occurs no abrupt change in the number of revolutions of the compressor, thereby ensuring the compressor motor of the air-conditioner to be controlled stably in the number of revolutions thereof.

According to the features of the motor drive apparatus of the embodiment of the invention, even if the converter is started or stopped while the motor is operating, rapid changes in the dc voltage can be eliminated, and the number of revolutions of the motor can be controlled stably.

The description of the invention hereinabove is made on condition that the dc voltage control system of the converter is ensured to operate adequately, and that the dc voltage is controlled precisely in response to the dc voltage command value. However, it is difficult to ensure that the dc voltage control in practical circuits can be operated under every conditions. In particular, in the vicinity of the minimum value of the chopper conduction ratio in the booster chopper circuit, its conduction ratio does not change linearly. Thereby, dc voltage Ed cannot be controlled linearly to the limit of the full-wave rectification value of the power supply voltage. In other words, there is a difference in resultant dc voltage values between cases obtained with the chopper operation of the converter being stopped and obtained with the chopper conduction ratio at the minimum value thereof.

Therefore, there arises a particular point from which dc voltage Ed will not fall compliant with a dc voltage command value Ed* which is decreasing. According to the motor drive apparatus of the first embodiment of the invention, the dc voltage command value is caused to decrease gradually, and when dc voltage command value Ed* arrives at dc voltage reference value Vd2, the converter is caused to stop. However, when dc voltage Ed comes to a point of value Vd' which is slightly larger than dc voltage reference value Vd2 and from which the dc voltage Ed does not drop, a range of values lower than this dc voltage value Vd' is considered to be the range in which the converter circuit can no more control the dc voltage Ed, thereby, it is preferable to stop the operation of the converter at this dc voltage value Vd'.

EMBODIMENT 2

Now, a second embodiment of the invention will be described. This second embodiment of the invention has a modified type of dc voltage control arithmetic means 801 different from that of the first embodiment. The dc voltage control arithmetic means 801 has a feature that it can execute a smooth dc voltage control even if the power supply voltage fluctuates.

Figure 7:
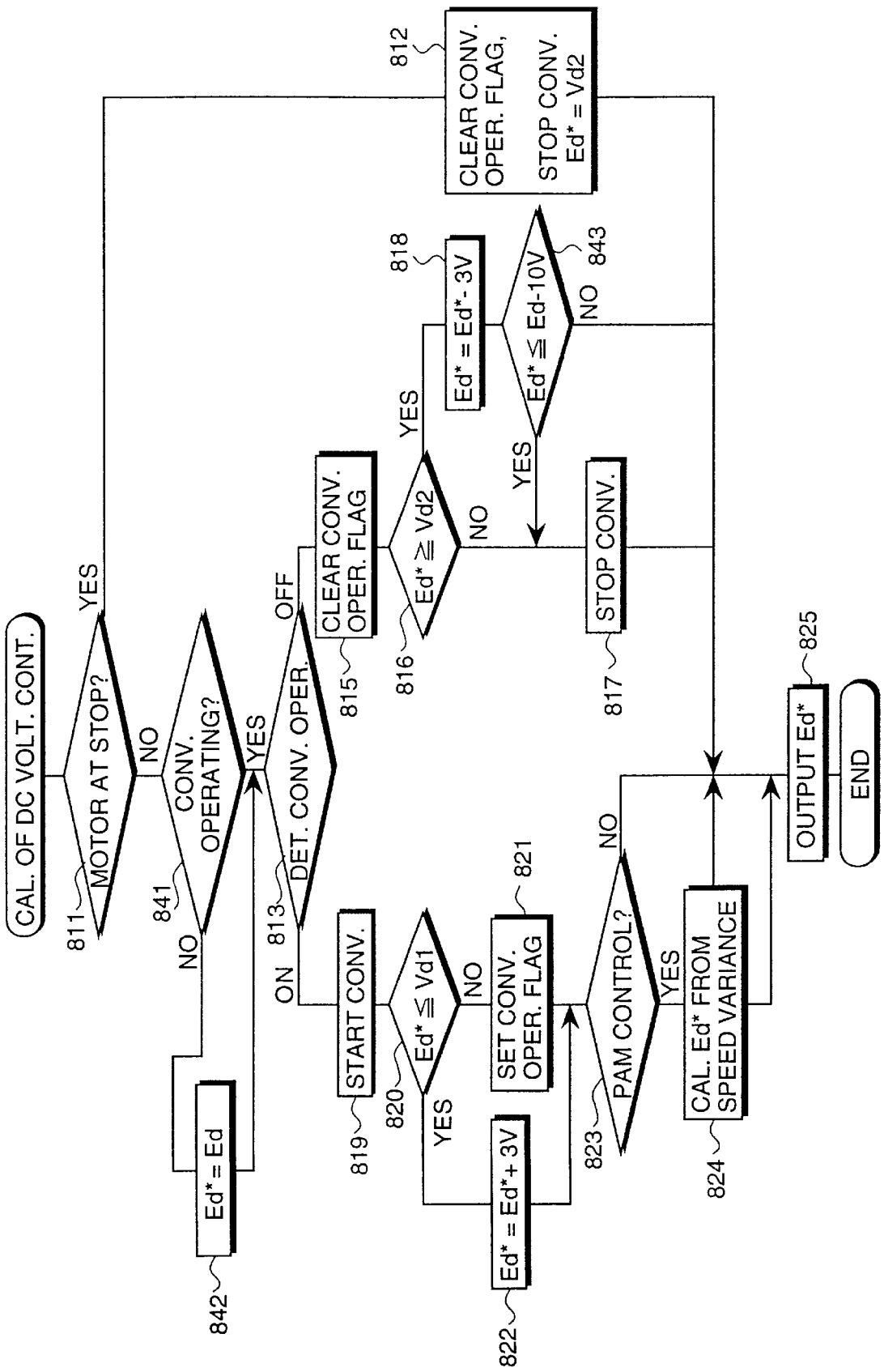
FIG. 7 is a diagram of flowchart indicating operations of d.c. voltage control arithmetic means 801 according to a second embodiment of the invention.

In the case of the commercial power supply, its power supply voltage fluctuates ±15%. Thereby, if dc voltage command value Ed* (initial value) and dc voltage reference values Vd are used as a fixed value, there arises a problem that the dc voltage control as initially conceived cannot be executed when the power supply voltage fluctuates. The dc voltage control arithmetic means 801 according to the second embodiment of the invention is contemplated to solve the above-mentioned problem Processing in dc voltage control arithmetic means 801 of the embodiment of the invention is depicted in a flowchart of FIG. 7. Differences from the dc voltage control arithmetic means 801 (in FIG. 3) of the first embodiment of the invention reside in providing three steps including steps (841), (842) and (843). The other steps are the same as those of the first embodiment of the invention.

In step (841), it is determined whether the converter is operating or not. Only when the converter is off, the step goes to (842) where dc voltage Ed is detected, and its detected value Ed is set as dc voltage command value Ed*. Processing in steps (841) and (842) is for setting a value of a full-wave rectification voltage of the power supply voltage as an initial value of dc voltage command value Ed* at the time of start-up of the converter. By this processing above, the power supply voltage can be estimated. Thereby, dc voltage command value Ed* (initial value) and dc voltage reference value Vd can be determined from the power supply voltage estimated above. In this embodiment of the invention, dc voltage command value Ed* (initial value) is determined from the power supply voltage.

Step (843) is a process to determine whether or not the dc voltage control is operating normally and accurately, in other words, whether dc voltage value Ed is decreasing in response to dc voltage command value Ed*. More specifically, in this step, dc voltage detection value Ed and dc voltage command value Ed* are compared. When a difference between dc voltage command value Ed* and dc voltage detection value Ed becomes greater than 10 V, the step goes to (817) to stop the operation of the converter.

By way of example, the dc voltage reference value Vd1 and dc voltage reference value Vd2 may be determined from the dc voltage value Ed having been detected in step (842). However, in this second embodiment of the invention, by taking into account the fluctuation of the power supply voltage, they are determined respectively to be a full-wave rectification voltage value at a maximum fluctuation and a minimum fluctuation of the power supply voltage.

By provision of a motor drive apparatus using the dc voltage control arithmetic means 801 according to the second embodiment of the invention, a smooth dc voltage control can be attained even if there occurs fluctuation in the power supply during the operation of the converter.

By way of example, the converter circuit 2 and dc voltage control arithmetic means 801 having been described both in the first and the second embodiments of the invention may be applied as a power circuit. However, when estimating a power supply voltage from the dc voltage Ed, a process once to normalize the dc voltage Ed is required. More particularly, a process to conduct dc voltage Ed through the load is required prior to its detection.

EMBODIMENT 3

Now, a third embodiment of the invention will be described in the following. This third embodiment of the invention is comprised of still another type of dc voltage control arithmetic means 801 different from that of the first embodiment of the invention. This dc voltage control arithmetic means 801 of the third embodiment is contemplated to provide for a motor drive apparatus operable at a maximum capacity thereof.

Figure 8:
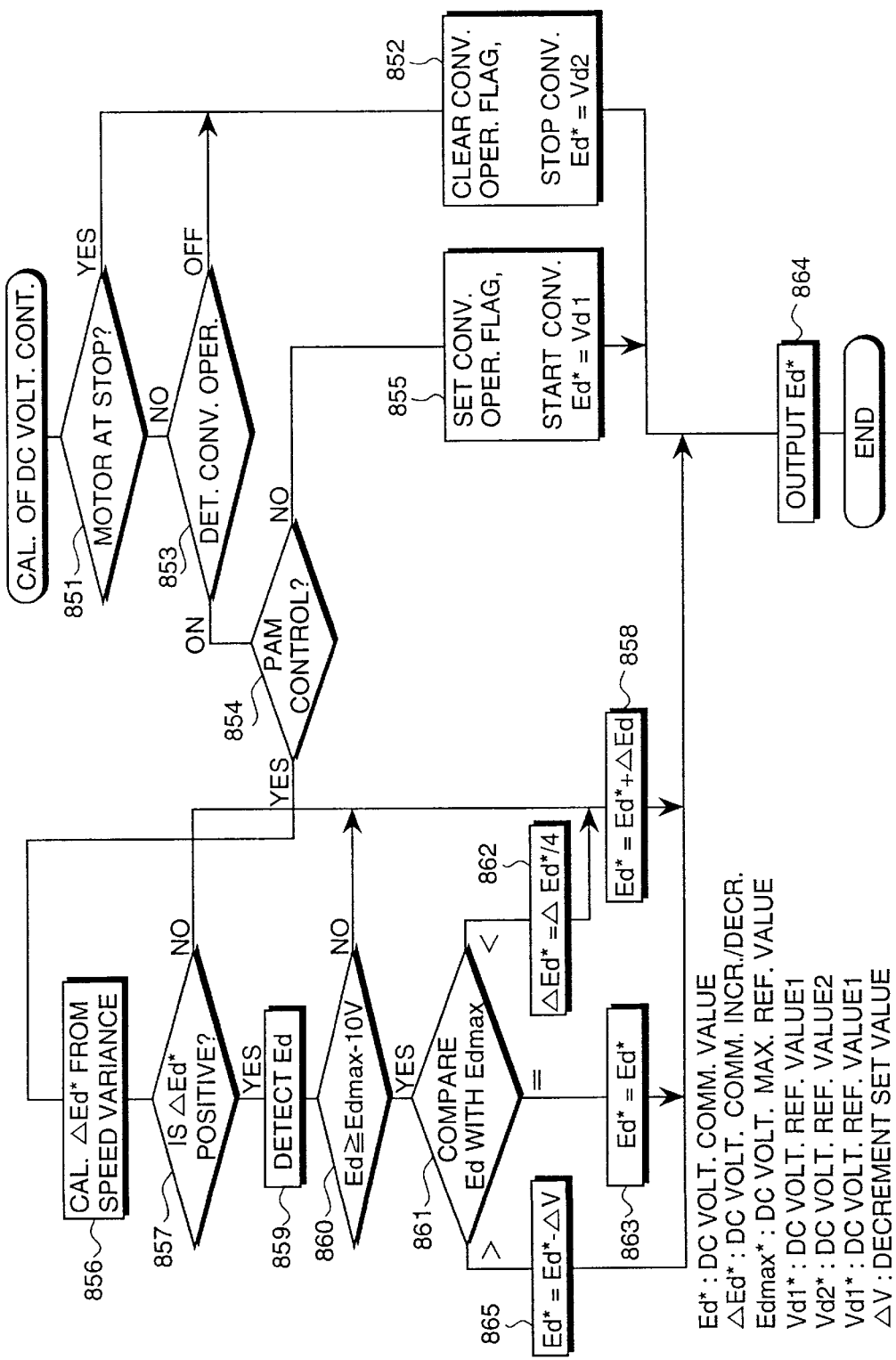
FIG. 8 is a diagram of flowchart indicating operations of d.c. voltage control arithmetic means 801 according to a third embodiment of the invention.

Steps of operation in this dc voltage control arithmetic means 801 of the third embodiment of the invention are depicted in a flowchart of FIG. 8.

In step (851), it is determined whether the brushless dc motor 4 is operating or not from the motor stop signal. When the motor is at stoppage, the step moves to (852) where the converter operate flag is cleared, and the converter ON/OFF signal is set to converter OFF. At this instant, its dc voltage command value becomes dc voltage reference value Vd2 (a full-wave rectification voltage value of the power supply voltage).

When the motor is operating, the step goes to (853) where it is determined whether or not the converter may be started on the basis of the operation enabling signal.

When the converter is determined to be off, the step goes to (852) to execute the process thereof. When the converter is determined operation enable, the step goes to (854) where it is determined whether the current motor control status is in the PWM control mode or in the PAM control mode. When in the PWM control status, the step goes to (855) where a converter operation flag is set, and the converter is driven. At this instant, dc voltage command value Ed* becomes dc voltage reference value Vd1 (a full-wave rectification voltage value of the power supply voltage plus 10 V).

In the case of the PAM control status, in step (856), an increment/decrement value $\Delta Ed^*$ of dc voltage command value Ed* is calculated from a speed variance. Here, $\Delta Ed^*$ is preset to have a positive sign when its speed variance is positive, namely, when acceleration is required, and a negative sign when its speed variance is negative, namely, when deceleration is required.

In step (857), it is determined whether increment/decrement value $\Delta Ed^*$ of the dc voltage command value Ed* is positive or negative, and when negative, the step moves to (858) where dc voltage command value Ed* is reduced. It is preset such that when dc voltage command value Ed* is reduced, dc voltage Ed is reduced also.

When dc voltage command increment/decrement value $\Delta Ed^*$ is positive, the present dc voltage Ed is detected in step (859). Then, in step (860), dc voltage Ed is compared with a preset value which is obtained by subtracting 10 V from the dc voltage maximum reference value. If dc voltage value Ed is smaller than the preset value of dc voltage maximum reference value minus 10 V, the step jumps to (858) to execute the process thereof.

If dc voltage value Ed is larger than the preset value of dc voltage maximum reference value Edmax-10 V, the step goes to (861) where dc voltage value Ed and dc voltage maximum reference value Edmax are compared.

If dc voltage value Ed is smaller than dc voltage maximum reference value Edmax, the step goes to (862) where dc voltage command increment/decrement value $\Delta Ed^*$ is divided by 4 to produce such that $\Delta Ed^*=\Delta Ed^*/4$, which is added on to dc voltage command value Ed* in step (858).

According to the third embodiment of the invention, it is arranged such that if dc voltage command increment/decrement value $\Delta Ed^*$ is negative, the step jumps to (858) unconditionally to decrement dc voltage command value Ed*. However, it may be arranged such that additional processes subsequent to step (859) are included to compare dc voltage value Ed with dc voltage maximum reference value Edmax, and to increase a decremental width of dc voltage command value Ed if dc voltage value Ed exceeds dc voltage maximum reference value Edmax.

If dc voltage value Ed is equal to dc voltage maximum reference value Edmax, the step goes to (864) where dc voltage command value Ed is not altered (Ed*=Ed*), and is output as dc voltage command value Ed* in step (864).

If dc voltage value Ed is larger than dc voltage maximum reference value Edmax, the step goes to (865) where dc voltage command value Ed* is reduced by a decrement preset value $\Delta V$. Then, in step (864), its decremented dc voltage command value Ed* is output.

The decrement preset value $\Delta V$ and other values used here are determined on the basis of experiments conducted to obtain a stable dc voltage control. Further, the processes described above are repeated cyclicly at a control cycle which is sufficient to ensure adequate and effective speed control of the motor.

Figure 9:
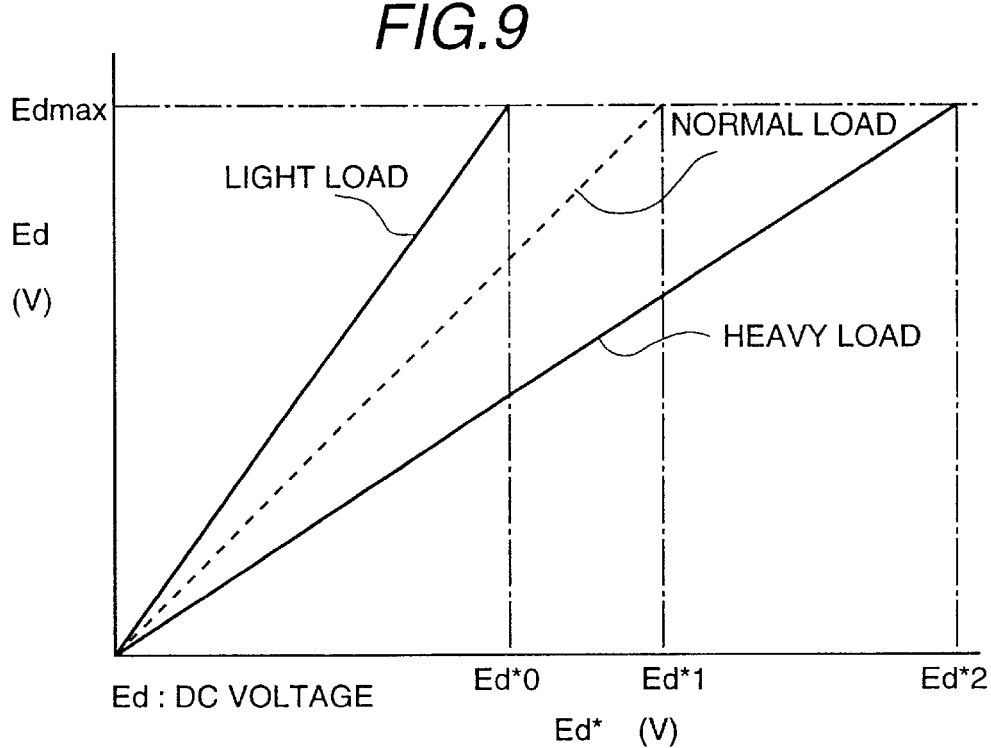
FIG. 9 is a diagram indicating d.c. voltage control characteristics obtained in the speed control of brushless d.c. motor 4 using d.c. voltage control arithmetic means 801 of the third embodiment of the invention.

With reference to FIG. 9, dc voltage control characteristics are indicated which were obtained with brushless dc motor 4 when its speed control was executed using the motor drive apparatus using dc voltage control arithmetic means 801 according to the third embodiment of the invention. FIG. 9 shows a relationship between dc voltage command value Ed* versus dc voltage value Ed. D.C voltage value Ed is shown on ordinate, and dc voltage command value Ed* is shown on abscissa.

Under a normal load condition in which the characteristics of its dc voltage control system are maintained advantageously, since its dc voltage value Ed coincides with its dc voltage command value Ed*, Edmax is output at Ed*1. However, under a heavy load or a light load, there arises an error in the dc voltage control characteristics, thereby causing a problem that Edmax is not attained at Ed*1 of the dc voltage command value, or contrarily the dc voltage value Ed exceeds Edmax.

According to the dc voltage control arithmetic means 801 of this embodiment of the invention, under a heavy load condition, since dc voltage command value Ed* is increased to Ed*2, its dc voltage value can be controlled up to Edmax. To the contrary, under a light load condition, since dc voltage command value Ed* will not go up more than Ed*0, its dc voltage value will not rise more than Edmax. Thereby, irrespective of load conditions, the dc voltage can be always controlled up to maximum value Edmax.

Figure 10:
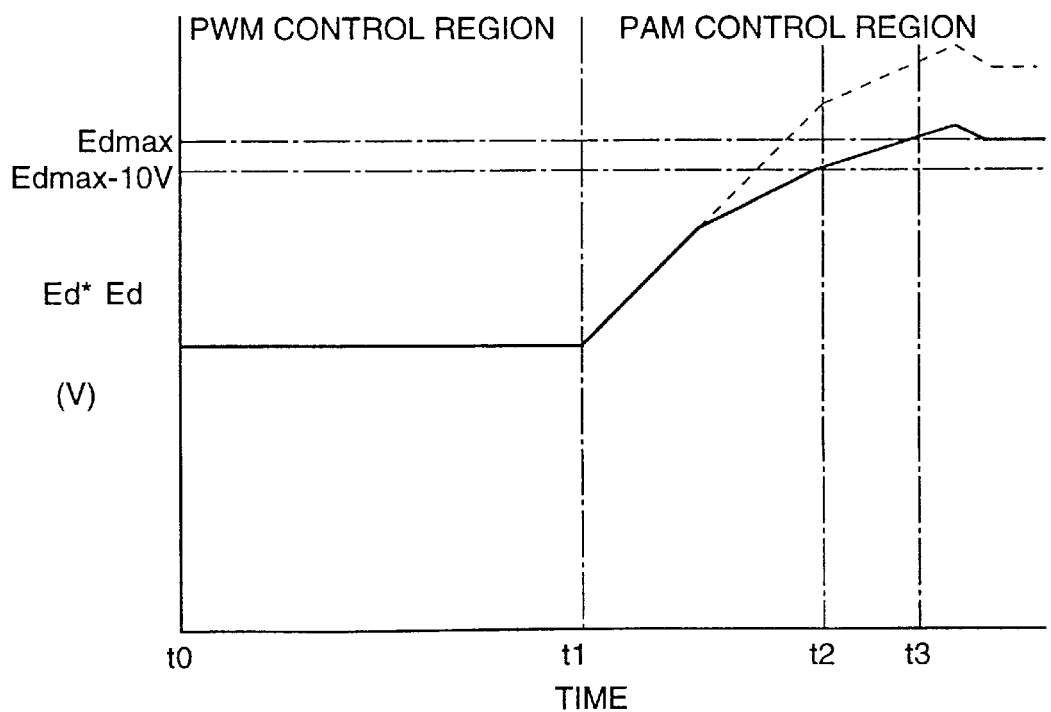
FIG. 10 is a diagram indicating changes of d.c. voltage command value Ed* and d.c. voltage value Ed versus time elapsed, when d.c. voltage control arithmetic means 801 of the third embodiment of the invention was applied to the motor drive apparatus thereof.

Now, with reference to FIG. 10, changes of dc voltage command value Ed* and dc voltage value Ed versus time elapsed are depicted, which were obtained with a motor drive apparatus for driving an air-conditioner compressor motor using the dc voltage control arithmetic means 801 according to this embodiment of the invention.

Assume that at time t0 the motor is started and the converter is in operation. Until time t1, the speed control of the motor is executed by the PWM control, thereby causing no changes in dc voltage command value Ed* and dc voltage value Ed. After t1, the control status is switched over to the PAM control, thereby causing dc voltage value Ed to rise.

When the number of revolutions of the motor increases, the load increases accordingly, thereby causing a variance to occur between dc voltage command value Ed* and dc voltage value Ed corresponding thereto. When dc voltage value Ed reaches a preset value of (Edmax−10 V), an incremental rate ΔEd* of dc voltage command value Ed* is suppressed such that dc voltage value Ed is adjusted not to exceed Edmax.

When dc voltage value Ed reaches Edmax at t3, dc voltage command value Ed* is adjusted not to increase, and dc voltage value Ed is maintained at Edmax.

If, however, dc voltage value Ed is caused to overshoot at t3, dc voltage command value Ed* is caused to decrease such that dc voltage value Ed coincides with Edmax.

By way of example, FIG. 10 depicts such a case in which dc voltage Ed is caused to overshoot. Although they are drawn in linear lines to simplify the explanation, actually, they are represented by smooth curves, and variance between dc voltage command value Ed* and dc voltage value Ed is not so large as indicated in the drawing.

What is claimed is:

1. A converter control apparatus comprising:
converter circuits having a rectifying circuit for rectifying ac power to a dc voltage, a smoothing circuit and a chopper circuit for incrementing and decrementing the dc voltage by means of switching operation of switching elements and an energy storage effect by inductance; a dc voltage detection circuit for detecting a dc voltage value of a load coupled to said converter circuit; and a dc voltage control means for controlling the switching operation of said chopper circuit such that said dc voltage value coincides with a dc command value on the basis of an output value from said dc voltage detection circuit and said dc voltage command value; wherein when the switching operation of said chopper circuit is started by said dc voltage control means, the dc voltage value is caused to increase gradually to coincide with a predetermined value, and when the switching operation of said chopper circuit is stopped, the dc voltage value is caused to decrease gradually to coincide with a predetermined value.

2. A converter control apparatus according to claim 1, wherein said dc voltage control means for controlling the switching operation of said chopper circuit comprises correction arithmetic means which executes a dc voltage correction arithmetic operation and outputs a dc voltage correction value upon coincidence of an output value from said dc voltage detection circuit with said dc voltage command value such that the output value from said dc voltage detection circuit becomes a predetermined value; and means for controlling the switching operation of said chopper circuit such that said dc voltage correction value becomes equal to a predetermined value.

3. A converter control apparatus according to claim 1, further comprising an input current detection circuit for detecting an input current to said converter circuit, and converter operation determination means for enabling the switching operation of said chopper circuit only when an output value from said input current detection circuit is larger than a predetermined value.

4. A converter control apparatus according to claims 1, 2 or 3, wherein said dc voltage control means is further characterized in that when starting the switching operation of said chopper circuit in accordance with a determination signal from said converter operation determination means, upon starting the switching operation of said chopper circuit, the dc voltage command value is caused cyclicly to increment by a predetermined voltage value from a dc voltage minimum command value to a predetermined dc voltage target command value; and when stopping the switching operation of said chopper circuit, the dc voltage command value is caused cyclicly to decrement by a predetermined voltage value from the predetermined dc voltage target command value to the dc voltage minimum command value; and upon coincidence of the dc voltage command value with the dc voltage minimum command value, the switching operation of said chopper circuit is caused to stop.

5. A converter control apparatus according to claim 4, characterized in that a dc voltage value detected while the converter is OFF is defined as said dc voltage minimum command value.

6. A converter control apparatus according to claim 4, wherein the same is characterized in that, when stopping the switching operation of said chopper circuit, said dc voltage minimum command value is defined as a predetermined minimum dc voltage value, then a dc voltage command value and a dc voltage value corresponding thereto are compared, and when said dc voltage value does no more respond to the dc voltage command value, the switching operation of said chopper circuit is caused to stop.

7. A converter control apparatus according to claim 4, characterized in that, when stopping the operation of said chopper circuit, said dc voltage minimum command value is defined as a predetermined minimum dc voltage value, then a dc voltage command value and a dc voltage value corresponding thereto are compared, and when a difference between said dc voltage command value and said dc voltage value corresponding thereto becomes larger than a predetermined value, the switching operation of said chopper circuit is caused to stop.

8. A converter control apparatus according to claim 4, characterized in that, when stopping the switching operation of said chopper circuit, said dc voltage minimum command value is defined to be a minimum dc voltage value which is calculated from a power supply voltage minimum value, and the operation of the converter is stopped when a dc voltage command value becomes smaller than a dc voltage value corresponding thereto by a predetermined value.

9. A converter control apparatus according to claim 4, characterized in that a power supply voltage is estimated from a dc voltage value detected while the converter is OFF, and said dc voltage target command value is determined corresponding to an estimated value of the power supply voltage.

10. A converter control apparatus according to claim 9, wherein power is conducted first through the load coupled to said converter to attenuate the dc voltage.

11. A motor control apparatus having: a converter circuit which includes a rectifying circuit for rectifying ac power to a dc voltage, a smoothing circuit and a chopper circuit which increments and decrements the dc voltage by means of a switching operation of switching elements and an energy storage effect by inductance; an inverter circuit which is coupled to an output of said converter circuit; a dc voltage detection circuit for detecting a dc voltage value at the output side of said converter circuit; a dc voltage control means for controlling the switching operation of said chopper circuit on the basis of an output value from said dc voltage detection circuit and a dc voltage command value such that the dc voltage value coincides with the dc voltage command value; an inverter control circuit for controlling the switching operation of said inverter circuit to drive a motor coupled thereto; and speed control means which outputs a dc voltage command and conduction ratio signals to said dc voltage control means and said inverter control circuit for executing a speed control of the motor; characterized in that when starting the switching operation of said chopper circuit by means of said dc voltage control means, upon starting of the switching operation of said chopper circuit, the dc voltage value is controlled to increase gradually up to a predetermined value; and when stopping the switching operation of said chopper circuit, the dc voltage value is controlled to decrease gradually down to a predetermined value at which to stop the operation of said chopper circuit.

12. A motor control apparatus according to claim 11, further comprising:

correction arithmetic means which executes a dc voltage correction arithmetic operation when an output value from said dc voltage detection circuit coincides with said dc voltage command value such that the output value becomes a predetermined value and outputs a dc voltage correction value obtained; and a converter control circuit for controlling the switching operation of said chopper circuit such that the correction value obtained becomes equal to a predetermined value.

13. A motor control apparatus according to claim 11, further comprising an input current detection circuit for detecting an input current to said converter circuit, and converter operation determination means which enables the switching operation of said chopper circuit only when an output value from said input current detection circuit becomes larger than a predetermined value.

14. A motor control apparatus according to claims 11, 12 or 13, wherein said dc voltage control means is characterized in that: when starting the switching operation of said chopper circuit in accordance with a determination signal from said converter operation determination means, upon starting the switching operation of said chopper circuit, the dc voltage command value is caused to increase cyclicly by a predetermined incremental voltage value from the dc voltage minimum command value to a predetermined target dc voltage command value; and when stopping the switching operation of said chopper circuit, the dc voltage command value is caused to decrease cyclicly by a predetermined decremental voltage value from the predetermined target dc voltage command value to a dc voltage minimum command value; and upon coincidence of the dc voltage command value with the dc voltage minimum command value, the switching operation of said chopper circuit is caused to stop.

15. A motor control apparatus according to claim 14, wherein a dc voltage detection value detected while the converter is OFF is defined as said dc voltage minimum command value.

16. A motor control apparatus according to claim 14, wherein a dc voltage detection value detected while the motor is operating and the converter is OFF is defined as said dc voltage minimum command value.

17. A motor control apparatus according to claim 14, wherein when stopping the switching operation of said chopper circuit, by defining said dc voltage minimum command value as the predetermined minimum dc voltage value, a dc voltage command value and a dc voltage value corresponding thereto are compared, and then when the dc voltage value no longer responds to the dc voltage command value, the switching operation of said chopper circuit is stopped.

18. A motor control apparatus according to claim 14, wherein when stopping the switching operation of said chopper circuit, by defining said dc voltage minimum command value as the predetermined minimum dc voltage value, a dc voltage command value and a dc voltage value corresponding thereto are compared, and then when a difference between the dc voltage value and the dc voltage command value becomes larger than a predetermined value, the switching operation of said chopper circuit is stopped.

19. A motor control apparatus according to claim 14, wherein when stopping the switching operation of said chopper circuit, by setting said dc voltage minimum command value at a minimum dc voltage value calculated from a minimum value of a power supply voltage, the operation of the converter is caused to stop when the dc voltage command value becomes smaller than the dc voltage value by a preset value.

20. A motor control apparatus according to claim 14, wherein a power supply voltage is estimated from a dc voltage detection value detected while the converter is OFF, and said target dc voltage command value to be applied while the converter is ON is determined corresponding to an estimated value of the power supply voltage.

21. A motor control apparatus according to claim 20, wherein power is conducted first through said motor to attenuate the dc voltage.

22. A motor control apparatus according to claim 14, wherein the same is characterized in that a power supply voltage is estimated from a dc voltage detection value detected while the motor is operating and the converter is OFF, and said target dc voltage command value to be applied while the converter is ON is determined corresponding to an estimated value of the power supply voltage.

23. A motor control apparatus according to claim 11, wherein the same is characterized by stopping the operation of the converter upon stoppage of said motor.

24. A motor control apparatus according to any one of claims 11 to 13 and 15 to 23, wherein speed control of the motor is executed by carrying out a conduction ratio control (PWM control) of the inverter when a load of the motor is light, and by carrying out a dc voltage control (PAM control) of the converter when the load of the motor is high.

25. An air-conditioner employing the motor control apparatus according to any one of claims 11 to 13 and 15 to 23 to a motor drive apparatus for driving a compressor thereof, wherein a speed command value for said motor is calculated from a room temperature set value and a room temperature, and the speed control of said motor is executed in accordance with said speed command value.

26. A converter control apparatus according to claim 5, wherein power is conducted first through the load coupled to said converter to attenuate the dc voltage.

27. A motor control apparatus according to claim 15, wherein power is conducted first through said motor to attenuate the dc voltage.

28. A motor drive apparatus having: a converter circuit which includes a rectification circuit for rectifying ac power to a dc voltage, a smoothing circuit and a chopper circuit which increments and decrements the dc voltage by means of switching operation of switching elements and an energy storage effect by inductance; an inverter circuit coupled to an output of said converter circuit; a dc voltage detection circuit for detecting a dc voltage value at the output side of said converter circuit; a dc voltage control means for controlling the switching operation of said chopper circuit from an output of said dc voltage detection circuit and a dc voltage command value such that the dc voltage value coincides with the dc voltage command value; an inverter control circuit for controlling a switching operation of said inverter circuit to drive a motor; a speed control means which outputs a dc voltage command value and conduction ratio signals to said dc voltage control means and said inverter control circuit for executing a speed control of the motor, wherein said dc voltage control means changes said dc voltage command value such that said dc voltage detection value will not exceed a preset value; and wherein said speed control means is characterized by executing speed control of said motor by carrying out a conduction ratio control (PWM control) of the inverter when the load of said motor is light, and by carrying out a dc voltage control (PAM control) of the converter when the load is high.

29. A motor drive apparatus according to claim 28, characterized by controlling said dc voltage command value not to increase any further when the dc voltage value exceeds a predetermined maximum dc voltage value.

30. A motor drive apparatus according to claim 28, characterized by continuously decrementing said dc voltage command value by a preset value at a preset cycle when the dc voltage value exceeds a preset maximum dc voltage value such that the dc voltage is controlled to coincide with the preset maximum dc voltage value.

31. A motor drive apparatus according to claim 28, wherein a quantity of increment of said dc voltage command value is changed when the dc voltage value approaches a predetermined maximum dc voltage value.

32. A motor drive apparatus according to claim 28, wherein the motor is a compressor motor of an air-conditioner, a speed command value for the compressor motor of the air-conditioner is calculated from a room temperature setting value and a room temperature, and then the speed control of the compressor motor of the air-conditioner is executed in accordance with said speed command value.

* * * * *